United States Patent [19]

Weissberger et al.

[11] Patent Number: 4,759,971

[45] Date of Patent: Jul. 26, 1988

[54] MULTILAYERED STRUCTURE

[75] Inventors: Wendy C. Weissberger, Alameda; Martin B. Dines, deceased, late of Laguna Beach, both of Calif., by Elaine Dines, legal representative

[73] Assignee: Occidental Research Corporation, Los Angeles, Calif.

[21] Appl. No.: 785,205

[22] Filed: Oct. 7, 1985

[51] Int. Cl.$^4$ ............... B32B 9/04; B32B 5/16; B32B 7/00

[52] U.S. Cl. .................... 428/215; 428/328; 428/423.3; 428/425.8; 428/425.9; 428/451; 428/458; 428/461; 428/463; 428/474.7; 428/474.9; 428/480; 428/511; 428/516; 428/518; 428/522; 428/523

[58] Field of Search ............... 428/328, 215, 423.3, 428/425.8, 425.9, 451, 458, 461, 463, 474.7, 474.9, 480, 511, 516, 518, 522, 523

[56] References Cited

U.S. PATENT DOCUMENTS

| | | | |
|---|---|---|---|
| 4,317,857 | 3/1982 | Kanda et al. | 428/328 |
| 4,390,690 | 6/1983 | Di Giacomo et al. | 528/395 |
| 4,429,111 | 1/1984 | Dines et al. | 528/395 |
| 4,436,899 | 3/1984 | Di Giacomo et al. | 528/395 |
| 4,487,922 | 12/1984 | Dines et al. | 528/395 |
| 4,564,555 | 1/1986 | Hornberger | 428/328 |

Primary Examiner—William J. Van Balen
Attorney, Agent, or Firm—Robert J. Baran

[57] ABSTRACT

This invention provides a multilayered structure comprising a substrate layer secured to a layer comprising a composite of a polymer and a particulate, layered compound selected from the group consisting of compounds represented by the general formula $M(O_3ZO_xR)_n$ wherein M is selected from the group consisting of tetravalent metal ions selected from the group consisting of Zr, Te, Pr, Mn, W, Sn, Pb, Ir, U, Si, Os, Hf, Ti, Ru, Nb, Ge, Th, Pu, V, Mo, Ce and mixtures thereof; Z is an atom selected from the group consisting of members of Group V of the Periodic Table of the Elements, having an atomic weight of at least 30; R is selected from the group consisting of hydrogen and organic radicals; n may equal 1 or 2, except that n is 1 when R is terminated by a tri- or tetra-oxy pentavalent atom and x varies from 0 to 1.

19 Claims, No Drawings

MULTILAYERED STRUCTURE

BACKGROUND OF THE INVENTION

1. Field of the Invention

The instant invention relates to multilayered structures comprising a substrate layer and a polymeric composite layer, secured to each other without a separate adhesive coating. The substrate may be a metal, e.g. aluminum, or a polymer film, e.g. a polyamide or a polyolefin film, or another rigid or flexible material. Multilayered structures comprising a metal substrate may have use in the architectural, automotive, and aircraft fields. Multilayered structures comprising a polymer film substrate may have use in packaging applications.

2. Summary of the Art

Multilayered structures have properties that are many times not obtainable in a single layered structure. Thus laminates of metals and polymers, wherein the laminate has the strength of the metal and the resistance to corrosion and sound deadening properties of the polymer are well known. Flexible film laminates wherein properties of the individual polymer films are imparted to the laminate are also widely used. For example, laminates of polyvinylidene chloride and polyamide have the excellent resistance to transmission of gases and water vapor of the polyvinylidene chloride film and the strength, scuff-resistance and gloss properties of the polyamide film. Thus, these film laminates are useful in packaging butter, soft cheese, margarine, fresh meat, etc.

In general multilayered structures comprising at least one polymer layer are prepared by bonding or laminating the separate layers to each other by using adhesives, sealing layers etc. or heat, such as in the coextrusion of polymer films and similar direct bonding processes. The use of adhesives and sealing layers is undesirable from an economic standpoint, since generally the adhesive or sealing layer contributes nothing to the properties of the multilayer structure other than delamination resistance and requires a separate application step. (The better adhesives are often solvent-based which involves the environmental and health problems of handling solvents.)

It is also known that to obtain a multilayered structure, having resistance to delamination, by direct bonding, the incorporation of additives in the polymer layer may be required. It has been found, however, that many, if not most additives that promote the adhesion of a polymer coating to substrates such as metals and other polymers having dissimilar chemical properties are not compatible with the polymer coating. (It is well known, for example, that tackifiers and similar adhesion promoters may tend to exude to the interface of the polymer coating and the substrate over time, or upon exposure of the multilayered structure to heat and moisture, thereby adversely affecting the delamination resistance of the multilayered structure.)

It will be appreciated that the laminating or bonding of polymers to substrates, without the use of adhesives or a sealing layer, would be preferred if additives were available that promoted the adhesion of the polymer and were also compatible with the polymer.

A novel class of compounds now has become known, which compounds may be described as inorganic polymers. These compounds are described in U.S. Pat. Nos. 4,232,146; 4,235,990; 4,235,991, 4,256,872, 4,267,308; 4,276,409; 4,276,410; 4,276,411; 4,298,723; 4,299,943; 4,373,079; 4,384,981; 4,386,013; 4,390,690; 4,429,111; and 4,436,899 which are hereby incorporated by reference. These compounds may be prepared having a layered structure similar to the layered structure of zirconium phosphate. The above patents teach that these novel layered compounds have many uses. However, these layered compounds have not been disclosed as useful in promoting the adhesion of polymers to substrates.

SUMMARY OF THE INVENTION

The present invention provides a multilayered structure comprising a substrate layer secured to a polymer composite layer. Said polymer composite comprises a polymer and a particulate, layered compound selected from the group consisting of compounds represented by the general formula $M(O_3ZO_xR)_n$ wherein M is selected from the group consisting of tetravalent metal ions selected from the group consisting of Zr, Te, Pr, Mn, W, Sn, Pb, Ir, U, Si, Os, Hf, Ti, Ru, Nb, Ge, Th, V, Pu, Mo, Ce and mixtures thereof; Z is an atom selected from the group consisting of members of Group V of the periodic table and having an atomic weight of at least 30; R is selected from the group consisting of hydrogen and organic radicals; n may equal 1 or 2, except that n is 1 when R is terminated by a tri- or tetra-oxy pentavalent atom and x varies from 0 to 1. Preferably, in the multilayered structure of this invention, Z is P; M is selected from the group consisting of Zr and Ti; and R is selected from the group consisting of hydrogen radicals, organo acyclic, alicyclic, heteroacyclic, heterocyclic, aromatic groups and mixtures thereof. The particulate, layered compound may be composited on the surface of the polymer in the multilayered structure of this invention, or homogeneously dispersed throughout said polymer by techniques known in the art for dispersing particulate solids in polymeric materials, such as thermoplastic polymers.

The polymers which may be used in the multilayered structures of the instant invention may be selected from the group consisting of polyamides, polyesters, polyolefins, polyurethanes, polyesters, etc. The multilayered structure of this invention also includes, as said substrate, a metal, e.g. aluminum, copper, ferrous alloys, etc. or said substrate may also be a polymer, e.g. a polyamide, a polyester, a polyolefin, a polyurethane, etc.

The multilayered structures of this invention, may be of any thickness, as dictated by the end-use requirement therefor. For example, said composite and said substrate may be superimposed film layers each having a thickness of no more than about 50 mils. In the multilayered structures of the instant invention, comprising laminated, polymeric film layers, at least one film layer may be a polyolefin, e.g. polypropylene. Especially contemplated polymeric film laminates are multilayered structures wherein one film layer is a polyolefin film and the other film layer is a nylon film, and wherein both film layers are polyolefin films. In another multilayered structure of the instant invention, the substrate is aluminum foil and the polymer composite layer comprises nylon.

DETAILED DESCRIPTION OF THE INVENTION

1. The Layered Compound

The compound useful in the products and method of the instant invention will be selected from the consisting of compounds represented by the formula $M(O_3\text{-}ZO_xR)_n$. In the above formula n may equal 1 or 2, except that n is 1 when R is terminated by a tri- or tetra-oxy pentavalent atom. M represents a tetravalent metal ion selected from the group consisting of

| Zr | Te | Pr | Mn | V |
|---|---|---|---|---|
| W  | Sn | Pb | Ir |   |
| U  | Si | Os | Hf |   |
| Ti | Ru | Nb | Ge |   |
| Th | Pu | Mo | Ce |   |

Z is an atom selected from the group consisting of the members of Group V of the Periodic Table of the Elements having an atomic weight of at least 30; R is selected from the group consisting of hydrogen and organic radicals and x varies from 0 to 1. More preferably, said compound will be selected from the group consisting of the compounds represented by the general formula $M(O_3PR)_2$, or $M(O_3POR)_2$.

The above compounds may be prepared by a process which comprises reacting, in a liquid medium, at least one acid compound, i.e. an organo-substituted, pentavalent-atom-containing acid, having the formula $((HO)_2OZO_x)_kR$ wherein k is 1 when n is 2 and k is 2 when n is 1, with at least one of the above tetravalent metal ions to precipitate a solid in which the molar ratio of pentavalent atom to tetravalent metal is 2 to 1, the pentavalent atom is covalently bonded to R and when x equals 1, R is linked to the pentavalent element Z through oxygen.

It should be noted that x will be 0 when the starting material for preparing the compound is represented by the general formula

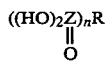

wherein n is 1 or 2, e.g.,

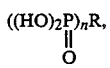

i.e., phosphorus acid or organophosphonic acids. When the starting material is represented by the general formula

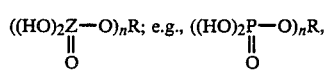

i.e., organophosphoric acids or phosphoric acid, x will be 1. If a mixture of such starting materials are used, x will vary from 0 to 1 in accordance with the ratio of the starting materials.

The tetravalent metal M and the pentavalent atom Z may be selected in accordance with the desired properties for the active moiety by those skilled in the art. However, M is preferably Zr or Ti and Z is preferably P.

R is selected from the group consisting of hydrogen radicals, organo acyclic, alicyclic heteroacyclic, heterocyclic, aromatic groups, and mixtures thereof. At least a portion of the R groups are selected to enhance the compatibility of the layered compound in the polymer. This selection may be conveniently done by tailoring the layered compound, through the R groups, to obtain a solubility parameter substantially equal to the polymer. This tailoring is similar to selecting a compatible plasticizer for the polymer, and is within the skill of the art. At least some of the R groups are selected to provide adhesion between the polymer and the substrate. Polar groups are known to provide adhesion to metals, therefore when the substrate is a metal, at least some of the R groups will be comprised of polar functional groups, e.g. sulfonate, phosphate, quaternary amino, carboxylate, etc. to enhance adhesion of the polymer to the substrate. When the substrate is a polymer, then R groups that are chemically similar to the polymer substrate may be selected. For example R groups comprising halide radicals may be used when the polymeric substrate is polyvinylchloride. In fact, compounds including haloethyl radicals will provide both compatibility with and adhesion to polyvinylchloride substrates.

R is also preferably chosen to enable the compound to achieve a layered structure. Thus, the size of the R may be important, since very bulky R groups may disrupt such layering.

In general, with phosphorus as the pentavalent atom, the organo group should occupy no more than about 24 $\text{Å}^2$ for proper spacing. The limitation is imposed by the basic crystal structure of zirconium phosphate. A spacing of 5.3 $\text{Å}^2$ is known for the space bounded by zirconium atoms. It follows that any group anchored on each available site cannot have an area much larger than the site area and maintain the layered structure.

This limitation can be avoided through the use of a combination of larger and smaller groups, i.e., mixed components. If some of the sites are occupied by groups which have an area much less than about 24 $\text{Å}^2$ adjacent groups can be larger than 24 $\text{Å}^2$ and still maintain the layered structure of the compound.

The cross-sectional area which will be occupied by a given organo group can be estimated in advance of actual compound preparation by the use of CPK space filling molecular models (Ealing Company) as follows: A model for the alkyl or aryl chain and terminal group is constructed, and it is situated on a scaled pattern of a hexagonal array with 5.3 Å site distances. The area of the group is the projection area on this plane. Some areas which have been determined by this procedure are listed in Table 1.

TABLE 1

| Moiety | Minimum Area ($\text{Å}^2$) | Moiety | Minimum Area ($\text{Å}^2$) |
|---|---|---|---|
| Alkyl chain | 15 | Isopropyl | 22.5 |
| Phenyl | 18 | t-Butyl | 25 |
| Carboxyl | 15 | Chloromethyl | 14 |
| Sulfonate | 24 | Bromoethyl | 17 |
| Nitrile | 9 | Diphenyl-phosphino | 50 (approx) |
| Morpholinomethyl | 21 | Mercaptoethyl | 13.5 |
| Trimethylamino | 25 | | |

Note that the bulk of the above described moieties must also be included when calculating the correct R group size for attaining the preferred layered structure in the support.

2. The Polymer

Although the above-described compounds may be utilized to enhance the adhesion of any polymer to a substrate, generally the polymer is film-forming polymer having properties that are useful in forming multilayered structures. (Since the particulate, layered compound may be tailored through R groups to be compatible with any polymer and provide adhesion between such polymer and any substrate, the polymers that are useful in the multilayered structures of this invention are limited only to polymers that may be formed into films, i.e. layers.) Examples of suitable polymers include polyamides, polyesters, polyolefins, polyurethanes, polyvinylchlorides, poly vinylidene chlorides, etc.

These polymers are generally utilized in film thicknesses of from about 0.1 to 100 mils, preferably from about 0.5 to 15 mils, in the multilayered structures of this invention.

Typical films may include for example, films prepared from nylon polymers such as nylon-4, nylon-6, nylon-12, and nylon-6,6. (Note that nylon is defined for the purposes of this invention as any long chain synthetic polymer which has recurring amide groups as an integral part of the polymer chain.)

Another class of films which may be utilized in the multilayered structures of the instant invention include polyester films which may be prepared by the polyesterification of a dicarboxylic acid and a dihydric alcohol. For example, the polymerization of ethylene terephthalic acid or dimethyl terephthalate with propylene glycol, diethylene glycol, tetramethylene glycol or cyclohexane 1,4 dimethylol provide polymers useful as polyester films.

Particular films which are useful in forming the laminated structures of the instant invention are the polyolefin films. Polyolefins include polyethylene and polypropylene and various copolymers thereof. For example, polyethylene films may include carboxyl groups such as found in ethylene-carboxylic acid polymers or may include alcohol groups such as the hydrolyzed copolymers of ethylene and vinyl acetate. For example, ethylene-carboxylic acid copolymers and the salts thereof, having from about 0.5 to about 10 percent by weight of the carboxylic acid or salt comonomer, are useful in preparing the multilayered structures of the instant invention. Propylene may be copolymerized with ethylene, to provide ethylene-propylene copolymer film. Furthermore, terpolymers of ethylene, propylene and another comonomer such as a conjugated or nonconjugated diene provide useful polyolefin films. Copolymers of ethylene and acrylate esters are also useful as films. For example, ethylene-ethylacrylate copolymers having from about 20 to about 30 weight percent ethylacrylate and copolymers of ethylene and isobutyl acrylate having from about 20 to about 30 weight percent isobutyl acrylate provide films useful in preparing the multilayered structures of the instant invention. Finally, ethylene may be copolymerized with chlorinated monomers, such as vinyl chloride and vinylidene chloride, to provide ethylene-vinylchloride copolymer films and ethylene-vinylidene chloride copolymer films, respectively. Such films may advantageously contain from about 5 to about 40 percent chlorine.

3. The Substrate

The substrate utilized in the multilayered structures of the instant invention may be a metal or another rigid material, such as wood, particle board, pressboard, masonry, wallboard, ceramic etc. Suitable metals include aluminium, steel, copper. The metal may also provide a flexible substrates, e.g. aluminum foil.

The substrate may also be polymeric, such as the polymers disclosed above, in both flexible film and rigid forms.

Especially useful structures are obtained by combining one or more of any of the above polyolefin films with nylon. For example, polyolefin films have excellent moisture vapor barrier properties but poor oxygen barrier properties. Nylon films on the other hand show good oxygen barrier properties but poor resistance to the passage of moisture vapor. When such nylon and polyolefin are combined, a composite structure is obtained which has both good oxygen barrier properties and moisture vapor barrier properties. In addition there is no adhesive to detract from the barrier properties of the polyolefin and nylon films described above. The particular structure has been found to be extremely useful in packaging the above described foodstuffs, especially butter, soft cheese, margarine, fresh meat and the like which are sensitive to water vapor and/or oxygen. Furthermore, the structures are useful in packaging beverages, meat products, fruits, vegetables, nuts, drugs or medicines, oils, or lotions and the like, which require protection from odors, moisture vapor, and/or oxygen. Multilayered structures of this invention are readily made by those versed in the art of coextrusion and sealing of the resulting layered composites. Shaping can be done subsequently by mechanical or thermoforming methods if necessary.

The invention is further illustrated by the following examples which are illustrative on a specific mode of practicing the invention and is not intended as limiting the scope of the appended claims.

EXAMPLE 1

The following polymer composites were prepared by intimately mixing powdered nylon 6,6 with 3 percent, by weight, of a particulate compound of the formula $Zr(O_3P(CH_2)_2COOH)_2$ or $Zr(O_3P(CH_2)_2Br)_2$.

Laminated samples of each of the nylon 6,6 composites bonded to aluminum foil were prepared by compression molding. All laminated samples were prepared at the same pressure and temperature. The resulting laminated samples were then subjected to the ASTM 0903–49 (1978, Part 22) peel strength test. The samples were labelled 1, 2, 3, 4, and control (nylon 6,6.)

The laminated samples were cut into one-inch (1") thick strips, and for each strip, one piece of aluminum foil was peeled back to expose one inch (1") of the plastic surface. One-inch wide reinforced adhesive tape was placed on the back of the foil to be peeled from the plastic surface for its entire length. Then all strips were conditioned overnight at 22° C., and fifty percent (50%) relative humidity prior to being subjected to the test.

The test was run under conditions as specified by the above ASTM test, except the cross head speed was five inches per minute.

The peel strength averages of five (5) samples of the Control and formulations 1 and 3, the peel strength average of formulation four (4) samples for 2, and an estimate of the peel strength for 4 are given in Table 1 following. The range of the readings per sample with the exception of 4 was fairly narrow; the standard deviation is approximately ± fifteen percent (15%).

TABLE 2

| Average Peel Strengths of Submitted Samples | |
|---|---|
| Sample No. | Peel Strength |
| Control | 0.48 lbs/in. |

TABLE 2-continued

Average Peel Strengths of Submitted Samples

| Sample No. | | Peel Strength |
|---|---|---|
| 1 | } Bromine Derivative | 0.59 lbs/in. |
| 3 | | 0.73 lbs/in. |
| 2 | } Acid | 2.88 lbs/in. |
| 4 | | 4.00 lbs/in. (estimate) |

Although all samples showed improved adhesion, obviously, samples 2 and 4 (the acid) are superior. On Sample 4, two (2) strips were peelable, but the foil was to strongly bonded to the nylon 6,6 to give directly valid data. An extrapolation of the curve between peel strength and width of foil peeled from the plastic was made to arrive at the value given in the table.

EXAMPLE 2

In the following example adhesion was measured using a peel strength test. For polymer-aluminum adhesion, the polymer was sandwiched between two strips of aluminum foil, and a "T: test was used. The aluminum foil was 8 mils thick, and was precleaned with a wash in trichloroethane followed by a methanol wipe.

(a) Preparation of Nylon-Aluminum Foil Multilayered Structure

Nylon 6 (Capron 6) was blended with 2%, by weight, $Zr(O_3PC_2H_4COOH)_2$ for three minutes after fluxing at 536° F. under nitrogen in a Brabender mixer. The nylon was laminated to the aluminum foil for 2 minutes at 560° F. Three data points were obtained for each run.

TABLE 3

| | Ave. | Adhesion, pounds per linear inch (p.l.i.) |
|---|---|---|
| Control (no additive) | 2.1 | 2.1, 2.1, 2.1 |
| Additive | 7.0 | 7.8, 6.7, 6.5 |

It is clear that the addition of the particulate, layered compound substantially increased the adhesion of the nylon to aluminum.

(b) Effect of Increasing the Concentration of the Particulate Layered Compound $Zr(O_3PC_2H_4COOH)_2$ was blended in Nylon 6 as above and laminated to aluminum foil.

TABLE 4

| Conc. of Additive | | (p.l.i.) | (Avg. p.l.i.) |
|---|---|---|---|
| 0.5% | A | 3.71 | 3.67 |
| | B | 3.63 | |
| 1.0% | A | 5.45 | 5.30 |
| | B | 5.17 | |
| | C | 5.29 | |
| 1.5% | A | 6.91 | 6.92 |
| | B | 6.93 | |

It is clear that increasing the concentration of the particulate, layered compound increases the adhesion between the nylon polymer and aluminum foil.

(c) The Effect of Lamination Temperature on the Peel Strength of Multilayered Structures of this Invention.

Note, as reported in Table 5 below, increasing the temperature of lamination increases the adhesion between the nylon film and aluminum foil. In this example, two percent, by weight, of $Zr(O_3PC_2H_4COOH)_2$ is blended with the nylon polymer as described above.

TABLE 5

| Effects of lamination temperature | | |
|---|---|---|
| Temp. | p.l.i. | Ave. p.l.i. |
| 300 F. | NA | NA |
| 350 F. | NA | NA |
| 400 F. | NA | NA |
| 450 F. A | 2.78 | 4.24 |
| B | 4.15 | |
| C | 5.80 | |
| 500 F. A | 5.03 | 5.52 |
| B | 5.57 | |
| C | 5.95 | |
| 550 F. A | 8.78 | 9.01 |
| B | 8.96 | |
| C | 9.29 | |

NA = no adhesion (d) Alternative Method for Preparing the Multilayered Structures of this Invention The particulate, layered compound was painted onto aluminum foil as a suspension prior to lamination with nylon 6, rather than blending the particulate, layered compound with the nylon as above. The lamination was carried out at 560° F.

TABLE 6

| | lbs./in. | |
|---|---|---|
| | Ave. | Indiv. Runs |
| Control (no additive) | 2.1 | 2.1, 2.1, 2.1 |
| Additive | 5.9 | 6.1, 6.5, 5.0 |

From the results reported in Table 6, it is seen that coating the aluminum foil with the particulate, layered compound improves the adhesion of nylon to aluminum foil as compared to the adhesion of nylon to the uncoated aluminum foil.

(e) Use of Carboxyphenyl Derivative as Additive $Zr(O_3PC_6H_4COOH)_2$ was painted on aluminum foil, as above, and the coated aluminum foil was laminated to nylon at 560° F.

TABLE 7

| | p.l.i. | p.l.i. |
|---|---|---|
| Additive A | 2.89 | |
| B | 2.23 | 2.99 |
| C | 3.86 | |
| Control (no additive) | 2.1 | 2.1 |

Again the adhesion of the coated aluminum foil to nylon is improved as compared to the uncoated control. The improvement over the control, with the carboxyphenyl derivative, is not as great as with the carboxyethyl derivative. Compare Example 2d.

(f) Multilayered Structure Comprising Polyester and Aluminum Foil

Goodyear 10067 a Polyester film, available from the Goodyear Company is blended for 3 minutes, at 30 r.p.m., with the particulate, layered compound after fluxing at 280° C. under $N_2$. The resulting composite was laminated to aluminum foil for 2 minutes at 560° F. The carboxyethyl derivative appears to increase adhesion, while the carboxyphenyl derivative does not.

TABLE 8

|  | Ave. p.l.i. | p.l.i. |
|---|---|---|
| Control (No additive) | 1.15 | 1.0, 1.3 |
| 2 wt. % Carboxyethyl derivative | 2.6 | 2.4, 2.9, 2.6 |
| 2 wt. % Carboxyphenyl derivative | 1.2 | 1.1, 1.4, 1.2 |

(g) Multilayered Structure Comprising Polyethylene and Aluminum Foil

A 1 mil low density polyethylene film (Tenite 1830) was blended for 5 minutes with $Zr(O_3PC_2H_4COOH)_2$ at 60 rpms. Lamination of the blended film to aluminum foil for two minutes at 410° F. resulted in the multilayered structure having the peel strength reported below in Table 9.

TABLE 9

|  | Ave p.l.i. | p.l.i. |
|---|---|---|
| Control (no additive) | 0.5 | 0.5, 0.5, 0.6 |
| Additive | 0.7 | 0.6, 0.8, 0.6 |

When $Zr(O_3PC_2H_4COOH)_2$ is painted on, as above, rather than blended with the polyethylene film, the following results are obtained:

TABLE 10

|  | p.l.i. | Ave. p.l.i. |
|---|---|---|
| Additive A | 1.37 | 1.12 |
| B | 0.92 |  |
| C | 1.07 |  |
| Control (no additive) | 0.5 | 0.5 |

Thus, a significant increase in adhesion between polyethylene and aluminum foil is found when the aluminum foil is coated with the carboxyphenyl derivative as described above.

(h) Multilayered Structure Comprising Polyethylene and Nylon

A multilayered structure comprising nylon 6 and low density polyethylene was prepared by blending the polyethylene with 2 percent by weight of $Zr(O_3PC_2H_4COOH)_2$ and laminating for 2 minutes at 560° F.

TABLE 11

|  | Ave. p.l.i. | p.l.i. |
|---|---|---|
| Control (no additive) | 0.2 | .15, .22 |
| Additive | 0.6 | .83, .4, .5 |

(i) Multilayered Structure Comprising Polyester and Vinylchloride

A polyester-polyvinyl chloride (PVC) laminate is prepared with $Zr(O_3PC_2H_4COOH)_2$ painted onto the surface of the PVC, as above. The polyester is blended at 25 rpm for 3 minutes, with 2 percent, by weight, $Zr(O_3PC_2H_4COOH)_2$, after fluxing under nitrogen for 3 minutes at 190° C. The PVC is Goodrich Geon 103EP, stabilized with Thermolite 31 alkyl tin mercaptide and the polyester is described above. The lamination was carried out for 2 minutes at 410° F.

TABLE 12

|  | p.l.i. |
|---|---|
| Control | N.A. |
| Additive | 1.8 |

While particulate embodiments of the invention have been described, it will be understood, of course, that the invention is not limited thereto since many obvious modifications can be made, and it is intended to include within this invention any such modification as will fall within the scope of the appended claims.

I claim:

1. A multilayered structure comprising a substrate layer secured to a layer comprising a composite of a polymer and a particulate, layered compound selected from the group consisting of compounds represented by the general formula $M(O_3ZO_xR)_n$ wherein M is selected from the group consisting of tetravalent metal ions selected from the group consisting of Zr, Te, Pr, Mn, W, Sn, Pb, Ir, U Si, Os, Hf, Ti, Ru, Nb, Ge, Th, Pu, V, Mo, Ce and mixtures thereof; Z is an atom selected from the group consisting of members of Group V of the Periodic Table of the Elements, having an atomic weight of at least 30; R is selected from the group consisting of hydrogen and organic radicals; n may equal 1 or 2, except that n is 1 when R is terminated by a tri- or tetra-oxy pentavalent atom and x varies from 0 to 1.

2. The multilayered structure of claim 1 wherein Z is P.

3. The multilayered structure of claim 1 wherein M is selected from the group consisting of Zr and Ti.

4. The multilayered structure of claim 1 wherein R is selected from the group consisting of hydrogen radicals, organo acyclic, alicyclic, heteroacyclic, heterocyclic, aromatic groups and mixtures thereof.

5. The multilayered structure of claim 1 wherein said particulate, layered compound is homogeneously dispersed throughout said polymer.

6. The multilayered structure of claim 1 wherein said polymer is a thermoplastic polymer.

7. The multilayered structure of claim 1 wherein said polymer is selected from the group consisting of polyamides, polyesters, polyolefins, polyurethanes, polystyrene, polyvinylchloride and copolymers thereof.

8. The multilayered structure of claim 1 wherein said substrate is a metal.

9. The multilayered structure of claim 1 wherein said metal is selected from the group consisting of aluminum, copper, iron and alloys thereof.

10. The multilayered structure of claim 1 wherein said substrate is a polymer.

11. The multilayered structure of claim 10 wherein said polymer is selected from the group consisting of polyamides, polyesters, polyolefins, polyurethanes, polystyrene, polyvinyl chloride and copolymers thereof.

12. The multilayered structure of claim 11 wherein said composite and said substrate are superimposed film layers each having a thickness of no more than about 50 mils.

13. The structure of claim 12 wherein at least one superimposed film layer is a polyolefin.

14. The structure of claim 12 wherein one film layer is a polyolefin film and the other film layer is a nylon film.

15. The structure of claim 14 wherein said polyolefin film is a polypropylene film.

16. The structure of claim 12 wherein both film layers are polyolefin films.

17. A multilayered structure according to claim 1 that is prepared by coextrusion.

18. The multilayered structure of claim 1 wherein said substrate is selected from the group consisting of wood, particle board, pressboard, masonry, wallboard and ceramic.

19. A composite of a nylon polymer and a particulate, layered compound selected from the group consisting of compounds represented by the general formula $M(O_3ZO_xR)_n$ wherein M is selected from the group consisting of tetravalent metal ions selected from the group consisting of Zr, Te, Pr, Mn, W, Sn, Pb, Ir, U, Si, Os, Hf, Ti, Ru, Nb, Ge, Th, Pu, V, Mo, Ce and mixtures thereof; Z is an atom selected from the group consisting of members of Group V of the Periodic Table of the Elements, having an atomic weight of at least 30; R is selected from the group consisting of hydrogen and organic radicals; n may equal 1 or 2, except that n is 1 when R is terminated by a tri- or tetra-oxy pentavalent atom and x varies from 0 to 1.

* * * * *